Patented July 16, 1940

2,207,738

UNITED STATES PATENT OFFICE 2,207,738

PRODUCTION OF d-ALTRONIC ACID AND ITS SALTS FROM SEDOHEPTULOSE

Claude S. Hudson, Washington, D. C., Nelson K. Richtmyer, Greene County, N. Y., and Raymond M. Hann, Washington, D. C., assignors to the Government of the United States as represented by the Secretary of the Treasury and his successors No Drawing. Application March 18, 1939, Serial No. 262,774

5 Claims. (Cl. 260—528)

(Granted under the act of March 3, 1883, as amended April 30, 1928; 370 O. G. 757)

This invention relates to the preparation of d-altronic acid and its salts and has for its object the provision of a method for preparing them from sedoheptulose (also known as sedoheptose and d-altroheptulose), a substance which has not been used before for this purpose, and which by this invention is made a new source for the preparation of d-altronic acid and its salts.

We have discovered that the method of degrading d-fructose, a 6-carbon ketone sugar, to d-arabonic acid, as modified by Spengler and Pfannenstiel (Zeitschrift der Wirtschaftsgruppe Zuckerindustrie, 1935, vol. 85, Technische Teil p. 547) from the earlier work of Nef and his collaborators (Nef (and Lucas), Liebigs Annalen, 1910, vol. 376, p. 55 note; Spoehr (and Rosario), American Chemical Journal, 1910, vol. 43, p. 240; Glattfeld, ibid., 1913, vol. 50, p. 152; Nef, Liebigs Annalen, 1914, vol. 403, p. 204), contrary to what could be predicted, may be extended to the 7-carbon ketone sugar sedoheptulose, even though such a method has never before been applied to any 7-carbon ketone sugar, and notwithstanding that sedoheptulose is unlike any other known ketoheptose in that it forms readily an anhydride, sedoheptulosan, of most unusual structure (Hudson, Jour. Am. Chem. Soc. vol. 60, p. 1241, year 1938).

The new method consists in the oxidation of sedoheptulose in alkaline solution by means of oxygen, and the subsequent isolation of the d-altronic acid in the form of a suitable salt such as calcium d-altronate. As shown in Hudson and Richtmyer Patent No. 2,162,721, granted June 20, 1939, application No. 225,806, filed August 17, 1938, calcium d-altronate is useful as a source for the preparation of d-ribose, a 5-carbon sugar which is of value in biological, biochemical and medical fields.

The following is an example of a typical experiment by which sedoheptulose has been converted to calcium d-altronate. First, a "crude syrup" was prepared, essentially as described by F. B. La Forge and C. S. Hudson (Journal of Biological Chemistry, 1917, vol. 30, p. 62). For this, the chopped leaves and stems of *Sedum spectabile*, Bor. were extracted with water, the extracts clarified and purified with activated carbon, and the solution concentrated at low temperature to prevent decomposition, e. g., in vacuo, to a thin syrup; this syrup was poured slowly into about five volumes of 95% ethyl alcohol, the precipitated material removed, and the filtrate concentrated at a low temperature to drive off the alcohol, this concentration being preferably carried on in vacuo to obtain a thick syrup; this syrup was diluted with water, treated with lead acetate precipitating lead protein derivatives and the like; the filtrate was treated with hydrogen sulfide, thus precipitating residual lead as lead sulfide which partially decolorizes and purifies by adsorption, and the final filtrate was concentrated to a "crude syrup" estimated to contain about 50%, by weight, of sedoheptulose.

For the oxidation, 21 g. of the crude sedoheptulose syrup was diluted with water to 150 cc. and rendered alkaline, as by mixing with 150 cc. of 2 normal potassium hydroxide in a bottle placed on a mechanical shaker. The air in the system was displaced by oxygen from a measuring reservoir, and vigorous shaking begun. With a room temperature of 29°, it was desirable to dissipate some of the heat of oxidation to prevent the degrading reaction of potassium hydroxide on the sugars, as by the use of an electric fan during the first 15 minutes of shaking. In the first 2 hours 1500 cc. of oxygen was absorbed, in the next 5 hours 400 cc. of oxygen, and overnight an additional 200 cc of oxygen, a total of 2100 cc. A second portion of sedoheptulose was oxidized in the same manner, and the combined pale yellow solutions concentrated in vacuo, viz., at low temperature to eliminate water, to a syrup. The cautious addition of 1 liter of methyl alcohol precipitated an oil-like syrup containing potassium altronate and potassium salts of other organic acids and left the excess potassium hydroxide in solution. The separated oil-like syrup was dissolved in water, the solution clarified with activated carbon, and hydrochloric acid added until the solution turned Congo red paper distinctly blue, indicating that all organic acids had been liberated from their potassium salts. The solution was concentrated in vacuo to a semi-solid mass of syrup and potassium chloride; water was added, the solution concentrated, and the process repeated to expel the volatile acids, especially formic acid and any excess hydrochloric acid. The residue was heated finally at 80° C. in vacuo further to remove water and volatile acids and to bring about lactone formation, by splitting off one molecule of water from the altronic acid, and then extracted several times with hot absolute alcohol. The extracts were concentrated, heated at 80° C. in vacuo, and this residue extracted with hot absolute alcohol to eliminate a little more potassium chloride. Evaporation of the alcohol in vacuo left a yellowish syrup. The lactone syrup was dissolved in 200 cc. of water and the solution heated with 15 g. of calcium carbonate for 2 hours on the steam bath, thus reconverting lactone to the acid neutralizing to form the calcium salts. The solids, mainly excess calcium carbonate, were removed by filtration through activated carbon and the colorless solution concentrated at low temperature, viz., in vacuo to 100 cc. The cautious addition of ethyl alcohol and a seed crystal resulted in the separation of typical clusters of prismatic needles of calcium d-altronate. After 5 hours the product was filtered, washed with dilute, then 95% alcohol, and dried in vacuo over granular calcium chloride. The weight was 4.8 g., plus 0.3 g. obtained from the mother liquor. One recrystallization yielded pure calcium d-altronate·3.5 H₂O, which was identified by analyses, and by its mutarotation in normal hydrochloric acid.

We have prepared from calcium d-altronate by indirect substitution or metathesis, for example, by removal of the calcium by oxalic acid and neutralization of the freed altronic acid, the new salts potassium d-altronate and lead d-altronate, both of which crystallize well.

A description of the present invention published by applicants appears in Journal Amer. Chem. Soc., vol. 61, p. 343, year 1939 (Richtmyer, Hann and Hudson).

The invention described herein may be used by or for the Government of the United States without payment of any royalty thereon.

We claim as our invention:

1. The process of preparing d-altronic acid from sedoheptulose which comprises degrading an alkaline solution of sedoheptulose with oxygen at about room temperature and recovering the altronic acid formed.

2. The process of preparing d-altronic acid from sedoheptulose which comprises oxidizing with oxygen an alkaline solution of sedoheptulose at about room temperature, liberating the organic acids, converting them to lactones, separating the lactones from the residual constituents, converting the lactones to the calcium salts of their respective acids, and crystallizing out the calcium d-altronate formed.

3. The process of preparing d-altronic acid from Sedum plants, which comprises forming a concentrated aqueous extract of the plant juices, separating the alcohol soluble constituents from the extract, separating the crude syrup from the alcohol, oxidizing with oxygen the crude syrup in alkaline solution, and recovering the d-altronic acid by crystallizing a salt thereof from the solution.

4. In a process for preparing d-altronic acid from sedoheptulose, the step of degrading the sedoheptulose in alkaline solution by oxidation with oxygen to form acids of less than 7-carbon atom content including d-altronic acid.

5. In a process for preparing d-altronic acid from an extract of the plant *Sedum spectabile*, Bor., the step of degrading the saccharine constituents of the extract in alkaline solution by oxidation with oxygen to form acids of less than 7-carbon atom content including d-altronic acid.

CLAUDE S. HUDSON.
NELSON K. RICHTMYER.
RAYMOND M. HANN.